US012025160B2

(12) United States Patent
Ray

(10) Patent No.: US 12,025,160 B2
(45) Date of Patent: Jul. 2, 2024

(54) HYDRAULIC CYLINDER PISTON ROD PROTECTION SYSTEM

(71) Applicant: CHROMEGUARD PTY LTD, Bayswater (AU)

(72) Inventor: Robert Ray, Dalwallinu (AU)

(73) Assignee: CHROMEGUARD PTY LTD, Bayswater (AU)

( * ) Notice: Subject to any disclaimer, the term of this patent is extended or adjusted under 35 U.S.C. 154(b) by 0 days.

(21) Appl. No.: 17/771,220

(22) PCT Filed: Oct. 23, 2020

(86) PCT No.: PCT/AU2020/051143
§ 371 (c)(1),
(2) Date: Apr. 22, 2022

(87) PCT Pub. No.: WO2021/077171
PCT Pub. Date: Apr. 29, 2021

(65) Prior Publication Data
US 2022/0364330 A1 Nov. 17, 2022

(30) Foreign Application Priority Data
Oct. 25, 2019 (AU) ................................ 2019904021

(51) Int. Cl.
*F15B 15/14* (2006.01)
*E02F 9/22* (2006.01)
*F15B 15/20* (2006.01)

(52) U.S. Cl.
CPC ........ *F15B 15/1423* (2013.01); *E02F 9/2271* (2013.01); *F15B 15/20* (2013.01); *F15B 15/1457* (2013.01)

(58) Field of Classification Search
CPC .. F15B 15/1423; F15B 15/20; F15B 15/1457; E02F 9/2271; E02F 9/226; E02F 9/23
See application file for complete search history.

(56) References Cited

U.S. PATENT DOCUMENTS 4,949,593 A * 8/1990 Vignoli .................... F16J 15/56 74/615
5,074,390 A * 12/1991 Fuhrmann ............. B05C 21/005 267/64.11
(Continued)

FOREIGN PATENT DOCUMENTS

DE 3731734 A1 4/1989
JP 2001082413 A 3/2001
JP 2006220179 A 8/2006

OTHER PUBLICATIONS

International Search Report & Written Opinion dated Jan. 18, 2021 from corresponding PCT Application No. PCT/AU2020/051143.

*Primary Examiner* — Dustin T Nguyen
(74) *Attorney, Agent, or Firm* — INNOVATION CAPITAL LAW GROUP, LLP; Vic Lin

(57) ABSTRACT

A protection system for a hydraulic cylinder piston having a barrel and a piston rod reciprocating therein, the protection system comprising a piston rod shield which is fixed with respect to the piston rod in use to move with respect to the barrel to cover the piston rod when the piston rod is exposed from the barrel and wherein the piston rod shield comprises a non-metallic flexible material which substantially returns to shape after deformation.

27 Claims, 4 Drawing Sheets

(56) References Cited

U.S. PATENT DOCUMENTS

| | | | | |
|---|---|---|---|---|
| 5,152,351 | A * | 10/1992 | Rieger | E02F 9/24 172/813 |
| 5,386,652 | A * | 2/1995 | Ramun | E02F 9/2275 37/231 |
| 6,843,005 | B2 * | 1/2005 | Clapper | E02F 9/2271 37/406 |
| 7,594,446 | B2 * | 9/2009 | Schwafertz | B25B 23/14 73/862.325 |
| 7,958,980 | B2 * | 6/2011 | Seino | E02F 9/24 74/615 |
| 9,976,623 | B2 * | 5/2018 | Murata | F16F 9/38 |
| 10,392,783 | B2 * | 8/2019 | Nishide | F15B 15/1423 |
| 10,415,608 | B2 * | 9/2019 | Van Gemert | F15B 15/1423 |
| 2017/0175841 | A1 | 6/2017 | Murata | |
| 2018/0044892 | A1 | 2/2018 | Nishide et al. | |

* cited by examiner

HYDRAULIC CYLINDER PISTON ROD PROTECTION SYSTEM

FIELD OF THE INVENTION

This invention relates generally to a system for protecting piston rods of hydraulic cylinders of excavators, especially those of exposed backhoe bucket cylinders.

BACKGROUND OF THE INVENTION

Piston rods of hydraulic excavator backhoe bucket cylinders are prone to damage on account of their exposed position, especially during operations such as double benching.

A burred piston rod may damage the wiper and rod seal of the barrel cap and the resultant downtime and maintenance may be very costly, especially for large excavators.

Metal channel boxes have been used to protect piston rods, but which however are themselves prone to damage, requiring continual maintenance and replacement and may itself damage the piston rod if sufficiently deformed.

The present invention seeks to provide a way to overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a cylinder piston rod protection system, especially suited for protecting exposed backhoe bucket cylinders.

The system comprises a piston rod shield fixed with respect to a piston rod of the cylinder so as to move with respect to a barrel thereof and to protectively cover the piston rod when the piston rod is exposed from the barrel. The piston rod shield may be semi-cylindrical.

The piston rod shield comprises a non-metallic flexible material which may comprise high density plastic such as high-density polyethylene (HDPE).

Experimentation shows that even when struck by large falling rocks, the non-metallic flexible piston rod shield is able to deform and protect the smooth surface of the piston rods even if coming into contact with the piston rod. The flexible piston rod shield thereafter returns to shape to withstand repeated blows.

The system may comprise a guide having a guide channel through which a proximal end of the piston rod shield slides. The guide channel may conform closely to exterior and interior surfaces of the piston rod shield including to mould the piston rod shield back to shape when passing therethrough. Longitudinally extending flanges may extend adjacent the guide channel to bear across outer or inner surfaces of the flexible piston rod shield.

The system may further comprise a barrel shield which may similarly comprise non-metallic flexible material. The piston rod shield may slide over the barrel shield and an outer surface of the barrel shield may conform to an undersurface of the piston rod shield such that the piston rod shield slides closely over the barrel shield.

The barrel shield may comprise sufficient radius to allow for the reticulation of piston port hydraulic hosing thereunder. The system may comprise a shaft collar holding a mount which engages an undersurface of the barrel shield and wherein the barrel mount comprises apertures therethrough through which the piston port hydraulic hosing is able to pass.

In a preferred embodiment, a distal end of the flexible piston rod shield comprises a shock absorber to absorb shock at this more exposed portion of the piston rod.

The shock absorber preferably comprises a rubber of plastic insert which conforms closely to an undersurface of the piston port shield. A piston rod shaft collar may hold a mount which may adjacently engaged the rubber insert adjacently.

It should be noted that whereas the present protection system has been described primarily with reference to protecting piston rods of backhoe bucket cylinders the present protection system may have application for protecting other types of hydraulic cylinders.

According to one aspect, there is provided a protection system for a hydraulic cylinder piston having a barrel and a piston rod reciprocating therein, the protection system comprising a piston rod shield which is fixed with respect to the piston rod in use to move with respect to the barrel to cover the piston rod when the piston rod is exposed from the barrel and wherein the piston rod shield comprises a non-metallic flexible material which substantially returns to shape after deformation.

The piston rod shield may comprise plastic.

The piston rod shield may comprise high density plastic.

The high density plastic may comprise at least one of high-density polyethylene (HDPE) and polyvinyl chloride (PVC).

The guide may form a guide channel and wherein a proximal end of the piston rod shield slides through the guide channel.

The guide channel may conform in shape to outer and inner surfaces of the piston rod shield.

The piston rod shield may be semi-cylindrical and wherein the guide channel may be semi-annular.

The guide may comprise a longitudinally extending flange which bearing on an outer surface of the piston rod shield.

The guide may be fixed to a cap of the barrel.

The guide may be platelike.

The guide may comprise apertures collocating with fastener apertures in a distal face of the cap.

The protection system may further comprise a barrel shield.

The barrel shield may comprise a non-metallic flexible material which substantially returns to shape after deformation.

The non-metallic flexible material may comprise plastic.

The barrel shield may comprise high density plastic.

The high density plastic may comprise at least one of high-density polyethylene (HDPE) and polyvinyl chloride (PVC).

The piston rod shield may slide over the barrel shield.

An outer surface of the barrel shield may conform in shape with an undersurface of the piston rod shield.

The piston rod shield may be semi-cylindrical and the barrel shield may be conformity semi-cylindrical.

The protection system may further comprise a barrel shaft collar holding a mount, the mount engaging an undersurface of the barrel shield.

The mount may comprise apertures therethrough for a rod port hydraulic hose.

A distal end of the piston rod shield may be supported by a shock absorber insert comprising non-metallic flexible material which substantially returns to shape after deformation.

The shock absorber insert may conform to an undersurface of the piston rod shield.

The piston rod shield may be semi-cylindrical and wherein the shock absorber insert may be semicircular/D-shaped.

The shock absorber may comprise high density plastic.

The shock absorber may comprise a thickness of greater than 1 cm.

The protection system may further comprise a piston rod shaft collar holding a mount engaging the shock absorber.

The mount may comprise apertures for fasteners to engage the shock absorber adjacently.

According to another aspect, there is provided a method of protecting a hydraulic cylinder piston having a barrel and a piston rod reciprocating therein using the system described herein, the method comprising applying the system to the cylinder such that the piston rod shield is fixed with respect to the piston rod to move with respect to the barrel so as to cover the piston rod when the piston rod is exposed from the barrel and to substantially return to shape after deformation.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 6:
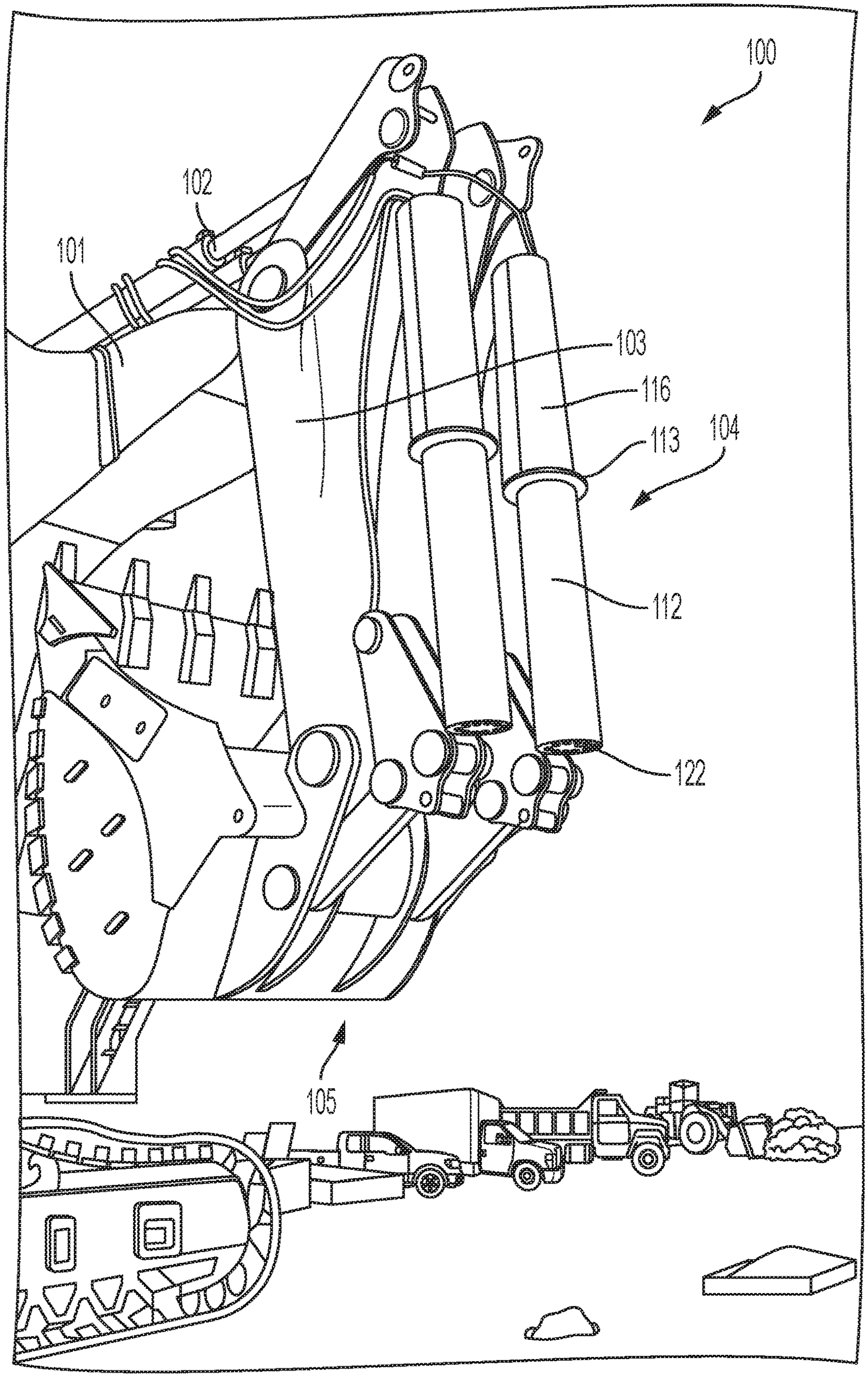
FIG. 6 shows the protection system protecting a pair of bucket cylinders of a backhoe when the cylinders are in an extended position.
Figure 7:
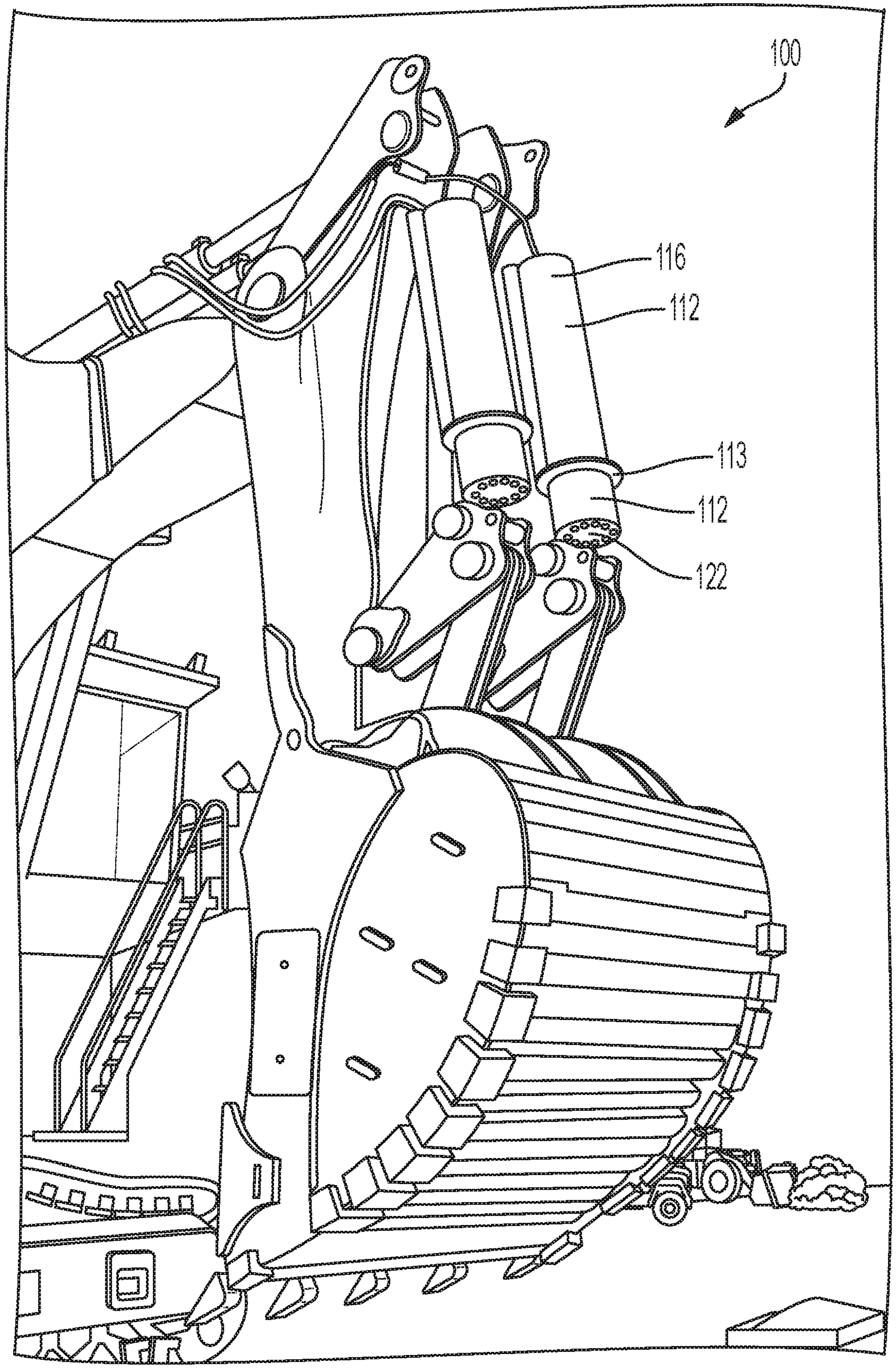
FIG. 7 shows the protection system when the backhoe cylinders are in a retracted position.

FIGS. 6 and 7 show a typical hydraulic excavator backhoe 100 such the Komatsu™ PC 5500. The backhoe 100 comprises a backhoe boom 101 and a dipper cylinder 102 controlling a stick/dipper 103 at a distal end thereof. The stick/dipper 103 may comprise one or two bucket cylinders 104 controlling a bucket 105 at a distal end thereof.

Figure 2:
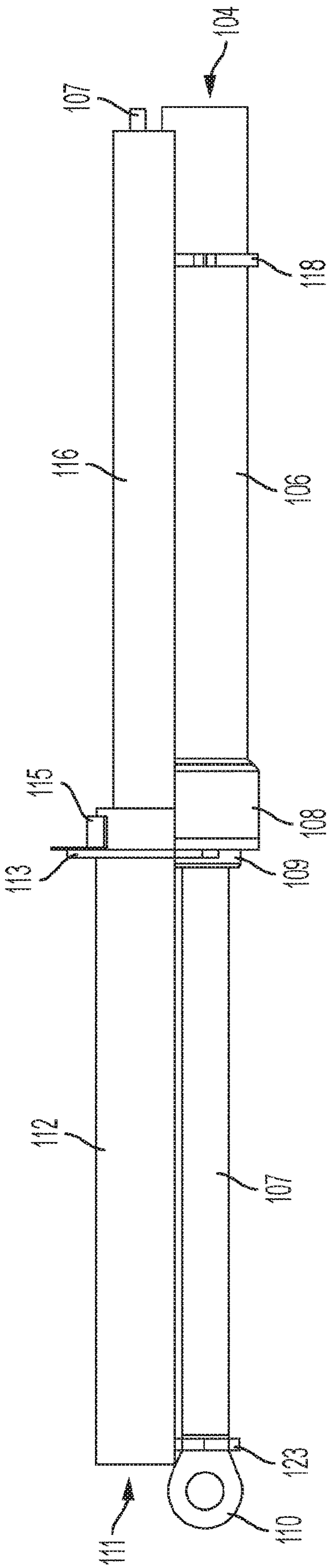
FIG. 2 shows a side elevation view of the protection system when engaged to a hydraulic cylinder.

With reference to FIG. 2, the cylinder 104 comprises a barrel 106 and a piston rod 107 reciprocating therein under hydraulic pressure. Hydraulic pressure is supplied to the cylinder 106 via hydraulic hoses 107.

The barrel 106 comprises a cap 108 comprising a wiper and rod seal 109 therein. A distal end of the rod 107 comprises a rod mount 110.

A protection system 111 comprises a flexible non-metallic piston rod shield 112 fixed to a distal end of the piston rod 107 to move with the piston rod 107 with respect to the barrel 106 to protectively cover the piston rod 107 when exposed.

The flexible piston rod shield 112 comprises a material which substantially returns to shape after deformation when being struck by rocks and the like.

The flexible piston rod shield 112 is non-metallic and may comprise rubber or plastic. In a preferred embodiment comprises high density plastic such as high-density polyethylene (HDPE) or polyvinyl chloride (PVC).

Figures 1A, 1B:
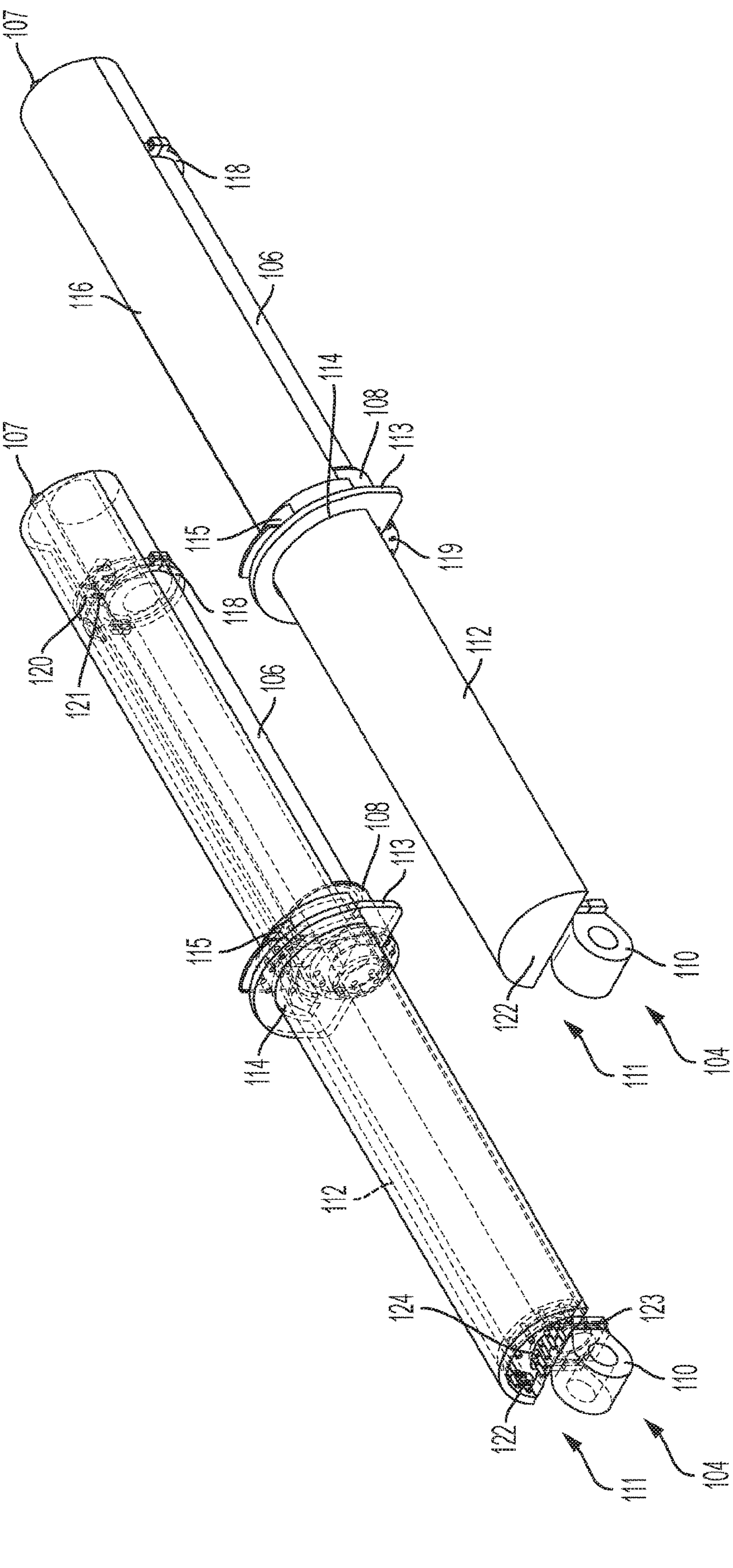
FIG. 1A shows an interior perspective view of a hydraulic cylinder protection system in accordance with an embodiment.
FIG. 1B shows a top perspective view of the hydraulic cylinder protection system.

The flexible piston rod shield 112 may be substantially channel shaped. In the embodiment shown, the piston rod shield 112 is substantially semi-cylindrical as shown in FIG. 1.

The protection system 111 may comprise a guide 113 fixed to the barrel 106. The guide 113 may be fixed to the cap 108 of the barrel 106. A proximal end of the flexible piston rod shield 112 may slide through the guide 113.

Figure 4:
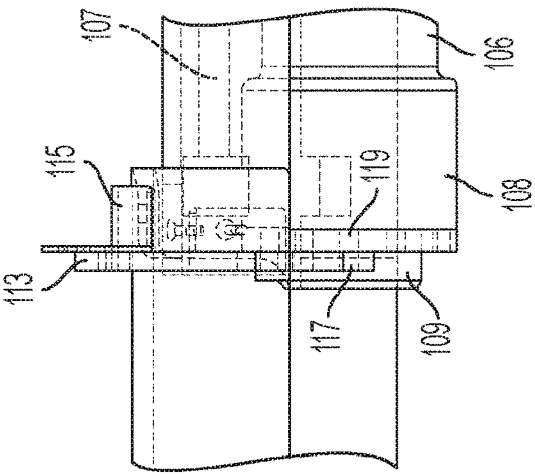
FIG. 4 shows a midsection of the protection system and cylinder including a piston rod shield guide in accordance with an embodiment.
Figure 5:
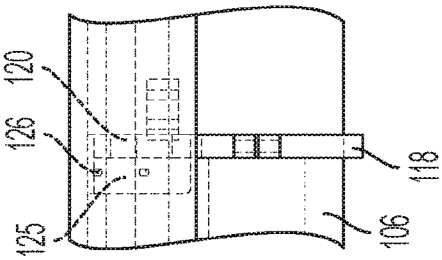
FIG. 5 illustrates a proximal end of the protection system and cylinder including a shaft collar for mounting a barrel shield in accordance with an embodiment.

With reference to FIG. 4, the guide 113 may take the form of a plate and wherein a lower end thereof comprises apertures 117 for fasteners to go into to collocating apertures 119 in a face of the cap 108. In alternative embodiments, the guide 113 comprises a rod of metal which is bent to form an arch. The rod itself may be approximately 20 mm in diameter.

The guide 113 may form a channel 114 closely conforming to a cross-section of the flexible piston rod shield 112. Where the flexible piston rod shield 112 is semi-cylindrical, the channel 114 may be correspondingly semi-annular so as to bear closely against both outer and inner surfaces of the flexible piston rod shield 112.

The guide 113 may comprise a longitudinally extending flange 115 to bear upon the adjacent upper surface of the flexible piston rod shield 112.

The system 111 may further comprise a barrel shield 116 fixed with respect to the barrel 106. The barrel shield 116 may similarly be flexible in being non-metallic comprising plastic or rubber including high density plastic.

In this embodiment, the flexible piston rod shield 112 slides over the barrel shield 116. The barrel shield 116 may comprise an outer surface conforming to an inner surface of the flexible piston rod shield 112. Where the flexible piston rod shield 112 is semi-cylindrical, the outer surface of the barrel shield 116 may be similarly semi-cylindrical and of smaller diameter.

The barrel shield 116 preferably has sufficient diameter to allow space for hydraulic hosing 107 for the rod and/or base ports of the cylinder 104 thereunderneath.

The system 100 may comprise a barrel shaft collar 118 engaging the barrel 106 and supporting a mount 120 engaging an undersurface of the barrel shield 116. The mount 120 may comprise apertures 121 therethrough for the rod port hydraulic hose 107.

The mount 120 may support an arched flange 125 which increases contact surface area with an undersurface of the barrel shield 116. The flange 125 may comprise a plurality of fastener apertures 126 therethrough.

A distal end of the flexible piston rod shield 112 may be supported by a conformingly shaped shock absorber insert 122. The shock absorber insert 122 may perform with the distal end of the shield 112. In embodiments, insert 122 may comprises rubber. In alternative embodiments, the insert 122 comprises high-density plastic, which may be the same material as that of the shield 112.

Where the flexible piston rod shield 122 is semi-cylindrical, the insert 122 may be semicircular/D-shaped so as to conform to the undersurface of the flexible piston rod shield 122.

Figure 3:
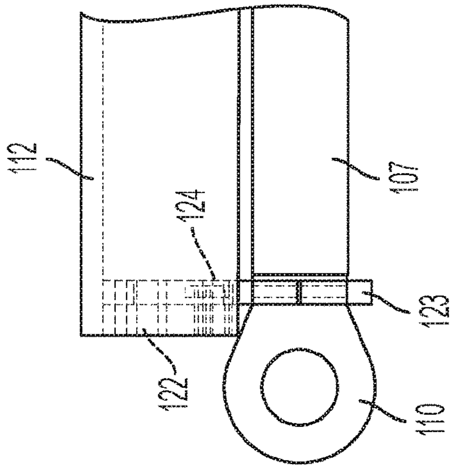
FIG. 3 shows a distal end of the protection system and cylinder.

With reference to FIG. 3, the system 111 may comprise a piston rod shaft collar 123 holding a piston rod mount 124 through which longitudinal fasteners engage the adjacent shock absorber insert 122.

FIG. 6 shows the backhoe 100 wherein the bucket cylinders 104 are extended such that the flexible piston rod shields 112 protectively cover the exposed piston rods 107.

FIG. 7 shows the bucket cylinders 104 retracted wherein the flexible piston rod shields 112 slide through the respective guides 113 and over respective barrel shields 116.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A protection system for a hydraulic cylinder piston having a barrel and a piston rod reciprocating therein, the protection system comprising:

a piston rod shield which is fixed with respect to the piston rod in use to move with respect to the barrel to cover the piston rod when the piston rod is exposed from the barrel and wherein the piston rod shield comprises a non-metallic flexible material which substantially returns to shape after deformation;

a barrel shield, fixed to the barrel and comprising a non-metallic flexible material which substantially returns to shape after deformation; and a barrel shaft collar holding a mount, the mount engaging an undersurface of the barrel shield, the mount having a width, defined in a direction parallel with a longitudinal axis of the barrel, that extends only a portion of a length of the barrel shield at only a proximate end thereof, where the proximate end is away from an end from which the piston extends; wherein the barrel shield is supported and spaced away from the barrel only by the mount, at one side thereof, and a guide attached to a barrel cap, on a second side thereof.

2. The protection system as claimed in claim 1, wherein the piston rod shield comprises plastic.

3. The protection system as claimed in claim 2, wherein the piston rod shield comprises high density plastic.

4. The protection system as claimed in claim 3, wherein the high density plastic comprises at least one of high-density polyethylene (HDPE) and polyvinyl chloride (PVC).

5. The protection system as claimed in claim 1, wherein the guide is fixed with respect to the barrel, wherein the guide forms a guide channel and wherein a proximal end of the piston rod shield slides through the guide channel.

6. The protection system as claimed in claim 5, wherein the guide channel conforms in shape to outer and inner surfaces of the piston rod shield.

7. The protection system as claimed in claim 6, wherein the piston rod shield is semi-cylindrical and wherein the guide channel is semi-annular.

8. The protection system as claimed in claim 6, wherein the guide comprises a longitudinally extending flange bearing on an outer surface of the piston rod shield.

9. The protection system as claimed in claim 5, wherein the guide is fixed to a cap of the barrel.

10. The protection system as claimed in claim 9, wherein the guide is platelike.

11. The protection system as claimed in claim 9, wherein the guide comprises apertures collocating with fastener apertures in a distal face of the cap.

12. The protection system as claimed in claim 1, wherein the non-metallic flexible material of the barrel shield comprises plastic.

13. The protection system as claimed in claim 12, wherein the barrel shield comprises high density plastic.

14. The protection system as claimed in claim 13, wherein the high density plastic comprises at least one of high-density polyethylene (HDPE) and polyvinyl chloride (PVC).

15. The protection system as claimed in claim 1, wherein the piston rod shield slides over the barrel shield.

16. The protection system as claimed in claim 15, wherein an outer surface of the barrel shield conforms in shape with an undersurface of the piston rod shield.

17. The protection system as claimed in claim 16, wherein the piston rod shield is semi-cylindrical and the barrel shield is conformity semi-cylindrical.

18. The protection system as claimed in claim 1, wherein the mount has a width, defined in a direction parallel with a longitudinal axis of the barrel, that is uniform with a width of the barrel shaft collar.

19. The protection system as claimed in claim 18, wherein the mount engaging the undersurface of the barrel shield comprises apertures therethrough for a rod port hydraulic hose.

20. The protection system as claimed in claim 1, wherein a distal end of the piston rod shield is supported by a shock absorber insert comprising non-metallic flexible material which substantially returns to shape after deformation.

21. The protection system as claimed in claim 20, wherein the shock absorber insert conforms to an undersurface of the piston rod shield.

22. The protection system as claimed in claim 21, wherein the piston rod shield is semi-cylindrical and wherein the shock absorber insert is semicircular/D-shaped.

23. The protection system as claimed in claim 20, wherein the shock absorber comprises high density plastic.

24. The protection system as claimed in claim 23, wherein the shock absorber comprises a thickness of greater than 1 cm.

25. The protection system as claimed in claim 20, further comprising a piston rod shaft collar holding a mount engaging the shock absorber.

26. The protection system as claimed in claim 25, wherein the mount engaging the shock absorber comprises apertures for fasteners to engage the shock absorber adjacently.

27. A method of protecting a hydraulic cylinder piston having a barrel and a piston rod reciprocating therein using the system as claimed in claim 1, the method comprising applying the system to the cylinder such that the piston rod shield is fixed with respect to the piston rod to move with respect to the barrel so as to cover the piston rod when the piston rod is exposed from the barrel and to substantially return to shape after deformation.

* * * * *